United States Patent
Kang et al.

(10) Patent No.: US 9,215,604 B2
(45) Date of Patent: Dec. 15, 2015

(54) METHOD AND DEVICE FOR UPDATING A DATABASE FOR WIRELESS LAN BASED POSITIONING

(75) Inventors: Suk Yon Kang, Seoul (KR); Seung Yoon Baek, Seoul (KR); Hye Min Lee, Gyeonggi-Do (KR); Chang Seok Lee, Seoul (KR); Chae Hwan Cho, Gyeonggi-Do (KR)

(73) Assignee: SK TELECOM CO., LTD., Seoul (KR)

( * ) Notice: Subject to any disclaimer, the term of this patent is extended or adjusted under 35 U.S.C. 154(b) by 287 days.

(21) Appl. No.: 13/808,328

(22) PCT Filed: Jun. 28, 2011

(86) PCT No.: PCT/KR2011/004701
§ 371 (c)(1),
(2), (4) Date: Mar. 22, 2013

(87) PCT Pub. No.: WO2012/005467
PCT Pub. Date: Jan. 12, 2012

(65) Prior Publication Data
US 2013/0170382 A1     Jul. 4, 2013

(30) Foreign Application Priority Data
Jul. 5, 2010   (KR) ...................... 10-2010-0064247

(51) Int. Cl.
| | |
|---|---|
| *H04L 1/00* | (2006.01) |
| *H04W 24/02* | (2009.01) |
| *H04W 64/00* | (2009.01) |
| *G01S 5/02* | (2010.01) |
| *H04W 84/12* | (2009.01) |

(52) U.S. Cl.
CPC ............... *H04W 24/02* (2013.01); *G01S 5/021* (2013.01); *G01S 5/0252* (2013.01); *H04W 64/00* (2013.01); *H04W 84/12* (2013.01)

(58) Field of Classification Search
CPC ....................................................... G01S 5/021
See application file for complete search history.

(56) References Cited

U.S. PATENT DOCUMENTS

| | | | |
|---|---|---|---|
| 2006/0089153 | A1 | 4/2006 | Sheynblat |
| 2006/0128372 | A1* | 6/2006 | Gazzola ........................ 455/424 |

(Continued)

FOREIGN PATENT DOCUMENTS

| | | |
|---|---|---|
| KR | 10-0645355 | 11/2006 |
| KR | 10-0677604 | 2/2007 |

(Continued)

OTHER PUBLICATIONS

International Search Report mailed Feb. 24, 2012 for PCT/KR2011/004701.

*Primary Examiner* — Huy D Vu
*Assistant Examiner* — Kevin Cunningham
(74) *Attorney, Agent, or Firm* — Hauptman Ham, LLP (57) ABSTRACT

An apparatus for updating a database for wireless LAN based positioning includes a database for storing grid cells divided by pCell ID and base station-derived environment information and wireless LAN environment information matched to the grid cells; a grid cell determining unit for determining an information-unmeasured grid cell among the grid cells, the information-unmeasured grid cell being a grid cell that has unmeasured information among parameters of the wireless LAN environment information matched to the grid cells; an unmeasured parameter checking unit for checking an unmeasured parameter in the information-unmeasured grid cell; a radiowave environment estimating unit for generating radiowave environment estimation information by estimating the unmeasured information based on the unmeasured parameter checked; and a database updating unit for reflecting the radiowave environment estimation information in the information-unmeasured grid cell determined.

10 Claims, 6 Drawing Sheets

(56) References Cited

U.S. PATENT DOCUMENTS

2008/0056211 A1* 3/2008 Kim et al. .................... 370/338
2008/0287140 A1* 11/2008 Lee et al. .................... 455/456.2
2010/0227634 A1* 9/2010 Takayanagi et al. .......... 455/500

FOREIGN PATENT DOCUMENTS

| KR | 10-2010-0033671 | 3/2010 |
| KR | 10-2010-0035244 | 4/2010 |

* cited by examiner

METHOD AND DEVICE FOR UPDATING A DATABASE FOR WIRELESS LAN BASED POSITIONING

TECHNICAL FIELD

The present disclosure relates in some aspects to a method and apparatus for updating a database for wireless local area network (LAN) based positioning. More particularly, the present disclosure relates to a method and apparatus for updating a database for wireless LAN based positioning, which, if there is unmeasured wireless LAN information in the process of constructing or managing a database in which base station-derived environment information and wireless LAN environment information are matched to grid cells divided by pilot cell identifier (pCell ID), determines an unmeasured cell and estimates radiowave environment information of the unmeasured cell to update the database.

BACKGROUND

The statements in this section merely provide background information related to the present disclosure and may not constitute prior art.

With the rapid development of computer, electronic and communication technologies, a variety of wireless communication services based on wireless networks have been provided. Accordingly, services provided by mobile communication systems based on wireless networks have evolved from voice services to multimedia communication services that transmit various data such as circuit data and packet data.

Among a variety of wireless Internet services using mobile communication terminals, a location based service (LBS) has attracted much attention due to the wide application and convenience thereof. An LBS is a communication service that determines the location of a mobile communication terminal, such as a mobile phone or a personal digital assistant (PDA), and provides additional information related to the determined location. Positioning technologies for providing an LBS may be classified into a network based positioning technology, a handset based positioning technology, and a hybrid positioning technology. Specifically, the network based positioning technology detects a location in a software manner by using a radiowave environment, which is a cell radius of a base station of a mobile network, in order to determine a location of a mobile communication terminal. The handset based positioning technology uses a Global Positioning System (GPS) receiver mounted on a mobile communication terminal in order to determine a location of a mobile communication terminal. The hybrid positioning technology is a combination of the network based scheme and the handset based scheme.

Among these technologies, the network based positioning technology is increasingly widely used. However, the network based positioning technology cannot provide accurate positioning due to a relay environment and the like.

DISCLOSURE

Technical Problem

Therefore, to solve the above-mentioned problems, the present disclosure seeks to provide a method and apparatus for updating a database for wireless LAN based positioning, which, in the process of constructing or managing a database in which base station-derived environment information and wireless LAN environment information are matched to grid cells divided by pCell ID, determines an unmeasured cell and estimates radiowave environment information of the unmeasured cell to update the database.

SUMMARY

An embodiment of the present disclosure provides an apparatus for updating a database for wireless LAN based positioning, including: a database for storing grid cells divided by pCell ID and base station-derived environment information and wireless LAN environment information matched to the grid cells; a grid cell determining unit for determining an information-unmeasured grid cell among the grid cells, the information-unmeasured grid cell being a grid cell that has unmeasured information among parameters of the wireless LAN environment information matched to the grid cells; an unmeasured parameter checking unit for checking an unmeasured parameter in the information-unmeasured grid cell; a radiowave environment estimating unit for generating radiowave environment estimation information by estimating the unmeasured information based on the unmeasured parameter checked; and a database updating unit for reflecting the radiowave environment estimation information in the information-unmeasured grid cell determined.

Another embodiment of the present disclosure provides an apparatus for updating a database for wireless LAN based positioning, including: a database for storing grid cells divided by pCell ID and base station-derived environment information and wireless LAN environment information matched to the grid cells; a grid cell determining unit for determining an information-unmeasured grid cell among the grid cells, the information-unmeasured grid cell being a grid cell that has unmeasured information among parameters of the wireless LAN environment information matched to the grid cells; an unmeasured parameter checking unit for determining that unmeasured information in the information-unmeasured grid cell is a received signal strength value and that position information of an AP transmitting a wireless LAN signal is stored in the information-unmeasured grid cell; a radiowave environment estimating unit for generating radiowave environment estimation information including first estimated AP signal strength information obtained by estimating a signal strength of the AP by applying the distance-dependent radiowave strength value application scheme to the position information of the AP; and a database updating unit for reflecting the radiowave environment estimation information in the information-unmeasured grid cell determined.

Yet another embodiment of the present disclosure provides an apparatus for updating a database for wireless LAN based positioning, including: a database for storing grid cells divided by pCell ID and base station-derived environment information and wireless LAN environment information matched to the grid cells; a grid cell determining unit for determining an information-unmeasured grid cell among the grid cells, the information-unmeasured grid cell being a grid cell that has unmeasured information among parameters of the wireless LAN environment information matched to the grid cells; an unmeasured parameter checking unit for determining that unmeasured information in the information-unmeasured grid cell is a received signal strength value and a MAC address of an AP transmitting a wireless LAN signal; a radiowave environment estimating unit for selecting adjacent grid cells among peripheral grid cells of the information-unmeasured grid call, estimating a common MAC address shared in the adjacent grid cells selected as the MAC address of the AP, and generating radiowave environment estimation information including a second estimated AP signal strength value obtained by estimating the received signal strength value as a signal strength mid-value of the AP corresponding to the common MAC address; and a database updating unit for reflecting the radiowave environment estimation information in the information-unmeasured grid cell determined.

Yet another embodiment of the present disclosure provides a method for updating a database for wireless LAN based positioning, including: determining an information-unmeasured grid cell among grid cells divided by pCell ID, the information-unmeasured grid cell being a grid cell that has unmeasured information among parameters of the wireless LAN environment information matched to the grid cells; checking an unmeasured parameter in the information-unmeasured grid cell; generating radiowave environment estimation information by estimating the unmeasured information based on the unmeasured parameter checked; and reflecting the radiowave environment estimation information in the information-unmeasured grid cell determined.

Yet another embodiment of the present disclosure provides a method for updating a database for wireless LAN based positioning, including: determining an information-unmeasured grid cell among grid cells divided by pCell ID, the information-unmeasured grid cell being a grid cell that has unmeasured information among parameters of the wireless LAN environment information matched to the grid cells; determining that unmeasured information in the information-unmeasured grid cell is a received signal strength value and that position information of an AP transmitting a wireless LAN signal is stored in the information-unmeasured grid cell; generating radiowave environment estimation information including first estimated AP signal strength information obtained by estimating a signal strength of the AP by applying the distance-dependent radiowave strength value application scheme to the position information of the AP; and reflecting the radiowave environment estimation information in the information-unmeasured grid cell determined.

Yet another embodiment of the present disclosure provides a method for updating a database for wireless LAN based positioning, including: determining an information-unmeasured grid cell among grid cells divided by pCell ID, the information-unmeasured grid cell being a grid cell that has unmeasured information among parameters of the wireless LAN environment information matched to the grid cells; determining that unmeasured information in the information-unmeasured grid cell is a received signal strength value and a MAC address of an AP transmitting a wireless LAN signal; selecting adjacent grid cells among peripheral grid cells of the information-unmeasured grid call; estimating a common MAC address shared in the adjacent grid cells selected as the MAC address of the AP; generating radiowave environment estimation information including a second estimated AP signal strength value obtained by estimating the received signal strength value as a signal strength mid-value of the AP corresponding to the common MAC address; and reflecting the radiowave environment estimation information in the information-unmeasured grid cell determined.

ADVANTAGEOUS EFFECTS

As described above, according to the embodiments of the present disclosure, if there is unmeasured wireless LAN information in the process of constructing or managing a database in which base station-derived environment information and wireless LAN environment information are matched to grid cells divided by pCell ID, an unmeasured cell is determined and radiowave environment information of the unmeasured cell is estimated to update the database, thereby making it possible to improve position accuracy in positioning. In addition, according to the embodiments of the present disclosure, a propagation prediction model is applied or interpolation based on an adjacent grid cell of an information-unmeasured grid cell is used to estimate radiowave environment characteristics, thus making it possible to reduce the time taken to directly measure radiowave environment characteristics.

DETAILED DESCRIPTION

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A pilot cell (hereinafter referred to as "pCell") described in the present disclosure is a network based positioning technology. The network based positioning technology is a positioning scheme that divides a positioning service target region into grid cells with a predetermined size, defines each grid cell as a pCell, constructs a database of the positioning results of the respective pCells, and uses the database to perform positioning. This positioning scheme can provide more accurate positioning results than other positioning schemes. Throughout the detailed description of the present disclosure, first estimated access point (AP) signal strength information, second estimated AP signal strength information, third estimated AP signal strength information, and fourth estimated AP signal strength information are signals obtained by estimating received signal strengths, and refer to signals divided according to a received signal strength estimating scheme.

Figure 1:
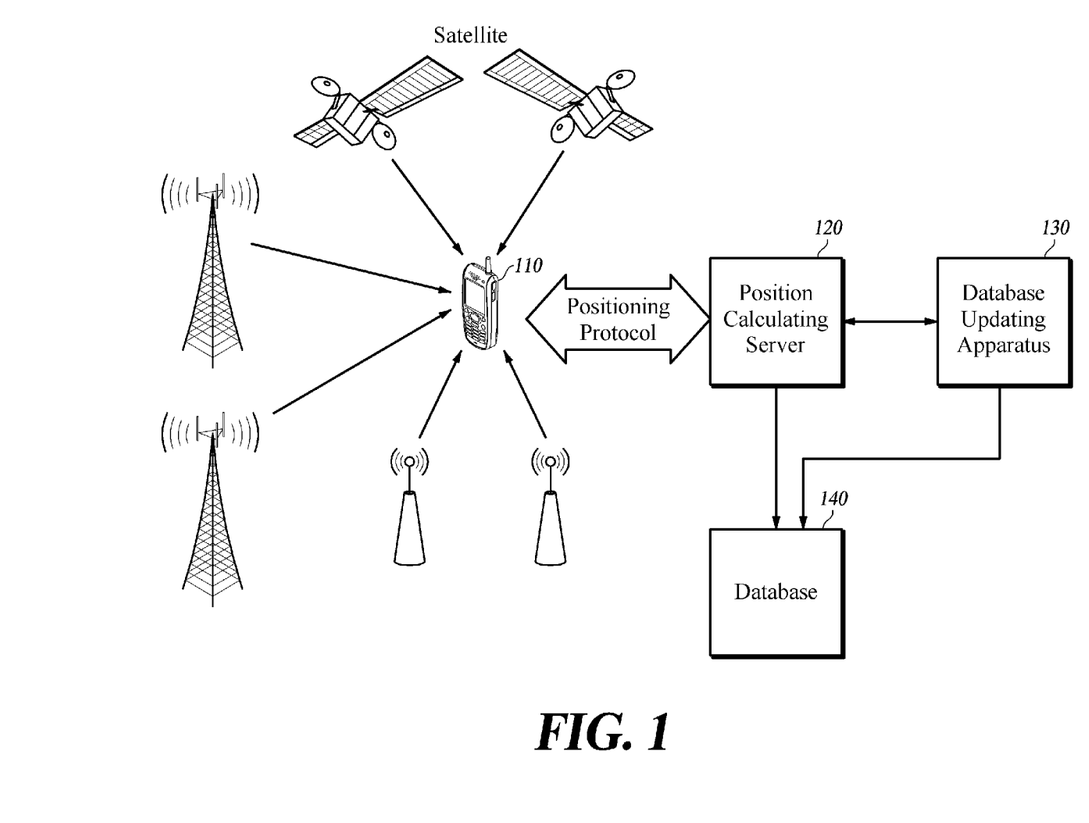
FIG. 1 is a block diagram illustrating a schematic configuration of a system for updating a database for wireless LAN based positioning according to one or more embodiments of the present disclosure.

FIG. 1 is a block diagram illustrating a schematic configuration of a system for updating a database for wireless LAN based positioning according to one or more embodiments of the present disclosure.

A system for updating a database for wireless LAN based positioning according to one or more embodiments of the present disclosure includes a mobile communication terminal 110, a position calculating server 120, a database updating apparatus 130, and a database 140. Although the system for updating a database for wireless LAN based positioning according to one or more embodiments of the present disclosure is described as including only a mobile communication terminal 110, a position calculating server 120, a database updating apparatus 130, and a database 140, the embodiment should be considered in descriptive sense only and not for the purposes of limitation and those skilled in the art will appreciate that various modifications, additions and substitutions may be made in the components of the system without departing from the essential characteristics of the present disclosure.

The mobile communication terminal 110 includes a wireless communication module for performing a general voice call and data communication. The mobile communication terminal 110 uses the wireless communication module to perform a general voice call and data communication in conjunction with a mobile network (not illustrated). The mobile communication terminal 110 transmits base station information of the mobile network to the position calculating server 120.

The mobile communication terminal 110 includes a wireless LAN module. The mobile communication terminal 110 uses the wireless LAN module to access the Internet through an adjacent AP to receive various webpage data. Herein, the AP is a device that connects data communication, reads a receiver's address from transmitter's information, designates the most suitable communication path, and transmits the same to other networks. Specifically, the AP may extract the position of a data packet, designate an optimal communication path for the extracted position, and transmit the data packet to a next device through the designated communication path, and may share a plurality of circuits in a general network environment. In the present embodiment, the AP may include a router, a repeater, a relay, and a bridge.

In addition, the mobile communication terminal 110 includes a global positioning system (GPS) module. The mobile communication terminal 110 extracts navigation data from a GPS radiowave signal received from one or more GPS satellites, and transmits the same to the position calculating server 120 through the mobile network. Herein, the mobile communication terminal 110 according to one or more embodiments of the present disclosure may include a GPS module but is not limited thereto.

The mobile communication terminal 110 may be a smart phone, a personal computer (PC), a notebook computer, or a personal digital assistant (PDA) that includes a wireless communication module, a GPS module, and a wireless LAN module. The mobile communication terminal 110 includes a memory for storing an application for providing a location based service, and a microprocessor for executing programs to perform operations and controls.

A positioning protocol is a protocol that standardizes an application layer for positioning. The positioning protocol may be any positioning protocol as long as it can communicate a GPS signal and a wireless LAN signal between the mobile communication terminal 110 and the position calculating server 120. The positioning protocol may include Interim Standard-801 (IS-801), Radio Resource Location Services Protocol (RRLP), Radio Resource Control (RRC), Secure User Plane Location (SUPL), or the like. SUPL 2.0 may be used as the positioning protocol to communicate both a GPS signal and a wireless LAN signal between the mobile communication terminal 110 and the position calculating server 120; however, the present disclosure is not limited thereto. Herein, SUPL is a scheme that sublates communication between network nodes necessary to perform a conventional positioning process, by allowing positioning-related data to be directly communicated between the mobile communication terminal 110 and the position calculating server 120 through a data transmission path. SUPL is a protocol that can reduce the cost for implementing nodes necessary for positioning tracking and can provide more accurate positioning services. When SUPL 2.0 is used, the mobile communication terminal 110 may use SUPL 2.0 to measure a round trip delay (RTD). Specifically, when using a wireless LAN signal for communication and setting wireless LAN parameters, the mobile communication terminal 110 may set a location identifier (ID) and multiple location IDs and measure an RTD including a RTD value, RTD units, and RTD accuracy as WLAN AP information.

The position calculating server 120 receives satellite data through a satellite receiver installed therein, and performs positioning by using satellite data of the mobile communication terminal 110 that requests positioning. Specifically, the position calculating server 120 receives navigation data from the mobile communication terminal 110 and calculates the latitude/longitude coordinates of the mobile communication terminal 10. In addition, the position calculating server 120 transmits aiding data for assisting in determining the position of the mobile communication terminal 110, and calculates a distance between a GPS satellite and the mobile communication terminal 110. In addition, when receiving position information from the mobile communication terminal 110 selectively if necessary, the position calculating server 120 transmits the position information to a location based service platform (LBSP). The position calculating server 120 may transmit latitude/longitude data that are positioning result data and pilot phase measurement (PPM) data that are received from the mobile communication terminal 110, to a server for pCell positioning. The position calculating server 120 receives a positioning request signal (Location Request) from the LBSP, and transmits an SMREQ signal requesting information on a terminal corresponding to a positioning target, to an HLR. The position calculating server 120 receives a smreq signal carrying a response to the SMREQ signal requesting information on the positioning target terminal, from the HLR. The position calculating server 120 may position the mobile communication terminal 110 in conjunction with the mobile communication terminal 110 and transmit a positioning response signal (Location Result) including the positioning result.

As the position calculating server 120, a Position Determination Entity (PDE) may be used in a synchronous Code Division Multiple Access (CDMA) system, a Position Server (PS) may be used in an asynchronous Wideband Code Division Multiple Access (W-CDMA) system, and a Serving Mobile Location Center (SMLC) may be used in a Global System for Mobile communication (GSM) system; however, the present disclosure is not limited thereto. In the CDMA system, the PDE may perform satellite-based positioning and network-based positioning by triangulation. In the W-CDMA system, the PS may perform satellite-based positioning and cell-based positioning. In the GSM system, the SMLC may perform satellite-based positioning and cell-based positioning.

The PPM data mentioned above may include time/distance information of an adjacent base station and system information measured by the mobile communication terminal 110. Herein, basic data collected by the mobile communication terminal 110 include information on a serving system, a pilot signal of an adjacent base station, a signal strength, and a signal-to-noise ratio (Ec/Io). The information on a serving system includes a system ID (SID), a network ID (NID), a base station ID (BSID), a serving base station sector number (reference PN: Ref_PN), a pilot phase in Ref_PN, and a signal strength. The pilot signal of an adjacent base station includes an adjacent base station sector number (measurement PN) collected from the mobile communication terminal 110, a pilot phase in each measurement PN, a signal strength, equidistant data, and time data. The PPM data are positioning-related data in the CDMA system, and may be UE RX-TX Time Difference data or System Frame Number (SFN)-SFN Observed Time Difference data in the W-CDMA system. However, the present disclosure is not limited thereto, and the PPM data may be positioning-related data used in any other communication systems.

Although the position calculating server 120 is described as being used in the CDMA and W-CDMA to provide pCell positioning, this should be considered in descriptive sense only and not for the purposes of limitation and those skilled in the art will appreciate that modifications may be made therein without departing from the essential characteristics of the present disclosure. For example, the position calculating server 120 may be used in WiBro, Long Term Evolution (LTE), and Evolved Packet Core (EPC) to provide pCell positioning.

According to one or more embodiments of the present disclosure, the database updating apparatus 130 determines an information-unmeasured grid cell among grid cells divided by pCell ID stored in the database 140, wherein the information-unmeasured grid cell is a grid cell that has unmeasured information among parameters of wireless LAN environment information matched to the grid cells. The database updating apparatus 130 checks an unmeasured parameter corresponding to the unmeasured information in the information-unmeasured grid cell determined, and generates radiowave environment estimation information by estimating the unmeasured information based on the unmeasured parameter checked. The database updating apparatus 130 reflects the radiowave environment estimation information in the information-unmeasured grid cell determined.

The data base updating apparatus 130 generates the radiowave environment estimation information by estimating the unmeasured parameter based on any one of a distance-dependent radiowave strength value application scheme and an adjacent grid cell-based interpolation scheme. Herein, the distance-dependent radiowave strength value application scheme may be a propagation prediction model including at least one of Okumura-hata and Cost231; however, the present disclosure is not limited thereto.

If the unmeasured parameter checked is a received signal strength value and if position information of an AP transmitting a wireless LAN signal is stored in the information-unmeasured grid cell, the data base updating apparatus 130 generates the radiowave environment estimation information including first estimated AP signal strength information obtained by estimating a signal strength of the AP by applying the distance-dependent radiowave strength value application scheme to the position information of the AP. The data base updating apparatus 130 calculates an average signal strength value of APs located at the same distance from the information-unmeasured grid cell, and sets the average signal strength value calculated as a representative signal strength value of the APs located at the same distance from the information-unmeasured grid cell. The database updating apparatus 130 may store the representative signal strength value separately.

If the unmeasured parameter checked is a received signal strength value and a medium access control (MAC) address of an AP transmitting a wireless LAN signal, the database updating apparatus 130 selects adjacent grid cells among peripheral grid cells of the information-unmeasured grid call and generates the radiowave environment estimation information including an estimated MAC address obtained by estimating a common MAC address shared in the adjacent grid cells selected as the MAC address of the AP. Herein, the MAC address is unique information for identifying the AP, and refers to a basis service set Identifier (BSSID). The MAC address may be allocated 48 bits, and 24 bits among them are used to input information allocated by a manufacturer. A service set identifier (SSID) is also information for identifying the AP, and refers to a value set by a user. The database updating apparatus 130 generates the radiowave environment estimation information including a second estimated AP signal strength value obtained by estimating the received signal strength value as a signal strength mid-value of the AP corresponding to the common MAC address shared in the adjacent grid cells selected. The database updating apparatus 130 generates the radiowave environment estimation information including a third estimated AP signal strength value obtained by estimating a signal strength of the AP by applying the distance-dependent radiowave strength value application scheme to the grid cell in which the estimated MAC address is stored.

If the information-unmeasured grid cell is an outdoor region, the database updating apparatus 130 generates the radiowave environment estimation information including a fourth estimated AP signal strength value obtained by estimating a signal strength of an AP transmitting a wireless LAN signal, by applying a radiowave strength value application scheme based on prestored topographic information and building information. Herein, the radiowave strength value application scheme based on prestored topographic information and building information may be a cell planning tool; however, the present disclosure is not limited thereto. The database updating apparatus 130 receives measured wireless LAN environment information on the information-unmeasured grid cell from a measuring device, and updates the database 140 by applying a high weight to the measured wireless LAN environment information among the radiowave environment estimation information and the measured wireless LAN environment information.

According to another embodiment of the present disclosure, the database updating apparatus 130 determines an information-unmeasured grid cell among grid cells divided by pCell ID, wherein the information-unmeasured grid cell is a grid cell that has unmeasured information among parameters of the wireless LAN environment information matched to the grid cells, when determining that unmeasured information in the information-unmeasured grid cell is a received signal strength value and that position information of an AP transmitting a wireless LAN signal is stored in the information-unmeasured grid cell, generates radiowave environment estimation information including first estimated AP signal strength information obtained by estimating a signal strength of the AP by applying the distance-dependent radiowave strength value application scheme to the position information of the AP, and reflects the radiowave environment estimation information in the information-unmeasured grid cell determined.

According to yet another embodiment of the present disclosure, the database updating apparatus 130 determines an information-unmeasured grid cell among grid cells divided by pCell ID, wherein the information-unmeasured grid cell is a grid cell that has unmeasured information among parameters of the wireless LAN environment information matched to the grid cells, when determining that unmeasured information in the information-unmeasured grid cell is a received signal strength value and a MAC address of an AP transmitting a wireless LAN signal, selects adjacent grid cells among peripheral grid cells of the information-unmeasured grid call, estimates a common MAC address shared in the adjacent grid cells selected as the MAC address of the AP, generates radiowave environment estimation information including a second estimated AP signal strength value obtained by estimating the received signal strength value as a signal strength mid-value of the AP corresponding to the common MAC address, and reflects the radiowave environment estimation information in the information-unmeasured grid cell determined.

The database 140 is a database used for positioning. The database 140 stores positioning result data of each positioning as basic data, corresponding to grid cells divided by pCell ID, and also stores reference data representing the basic data. Herein, the reference data are compared in considering pattern matching in pCell positioning. The reference data greatly affect positioning accuracy. The reference data are updated when the database is updated.

A general database updating scheme updates reference data by arithmetically averaging newly-measured positioning result data and prestored basic data. Due to this data updating scheme, the degree of reflection of the newly-measured positioning result data on the updated reference data is small. In particular, if there are many basic data prestored in the database, even when the database is updated, the newly-measured positioning result data hardly affect the update of reference data.

In order for the positioning scheme to provide more accurate positioning results, the database should be updated to always retain the newest data (e.g., PN, pilot phase, signal strength, or the like). However, due to the characteristics of the above database updating scheme in a general pCell positioning scheme, a general database updating scheme fails to fully reflect a change in positioning environments such as a wireless environment and a positioning system state. For example, if a positioning system or a wireless environment for providing a positioning service changes continuously and frequently, currently-measured positioning result data may provide more accurate positioning results than reference data prestored in the database. In this case, reference data stored in the database should adaptively follow a change in a current positioning environment by reflecting currently-measured positioning result data at a higher level when updating reference data prestored in the database.

In addition, the database 140 stores grid cells divided by pCell ID and base station-derived environment information and wireless LAN environment information matched to the grid cells. Herein, the base station-derived environment information includes one or more of a system ID (SID), a network ID (NID), a base station ID (BSID), a base station sector number (reference PN: Ref_PN), a received signal strength indicator (RSSI), a signal-to-noise ratio (Ec/Io), and phase information. The wireless LAN environment information includes one or more of a MAC address of an AP relaying a wireless LAN signal, a received signal strength (RSS) for each MAC address, AP channel information, AP frequency information, and latitude information and longitude information on an AP.

The database 140 may be implemented internally or externally of the position calculating server 120 and the database updating apparatus 130. The database means a general data structure implemented in a storage space (hard disk or memory) of a computer system by using a database managing program (DBMS), and refers to a data storage type capable of freely performing data retrieval (extraction), deletion, editing, addition, or the like. The database may be implemented to be suitable for the purpose of one or more embodiments of the present disclosure by using a relational database management system (RDBMS) such as Oracle, Infomix, Sybase, or DB2, an object-oriented database management system (OODBMS) such as Gemston, Orion, or O2, and an XML native database such as Excelon, Tamino, or Sekaiju. The database includes suitable fields or elements for achieving its function.

Figure 2:
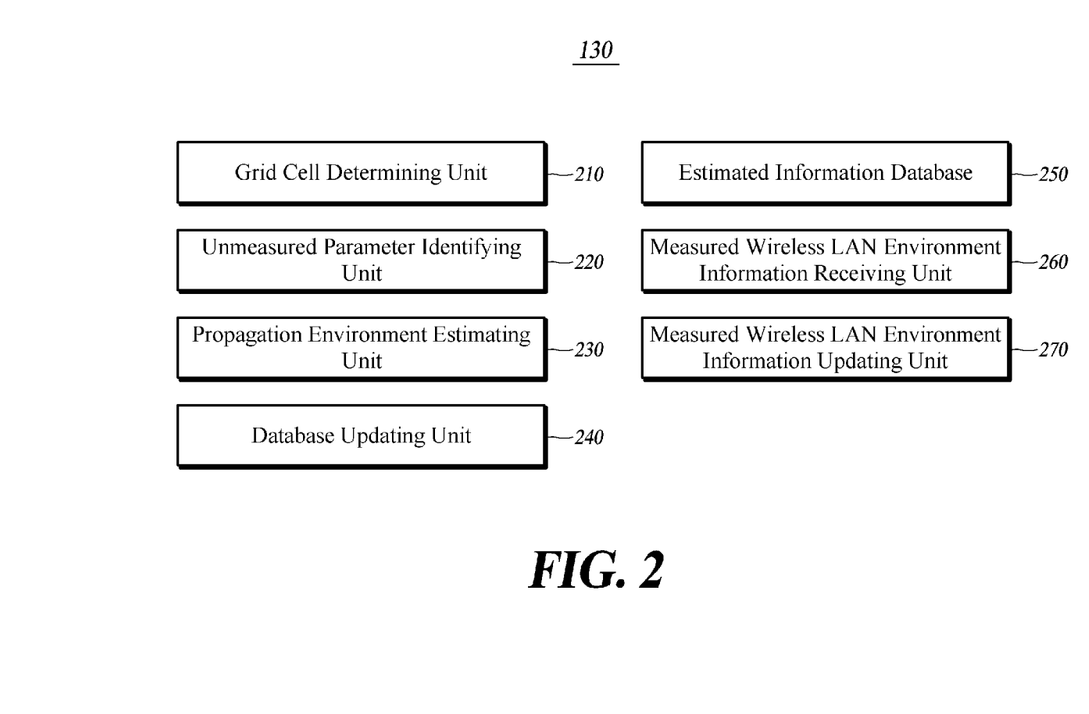
FIG. 2 is a block diagram illustrating a schematic configuration of a database updating apparatus for wireless LAN based positioning according to one or more embodiments of the present disclosure.

FIG. 2 is a block diagram illustrating a schematic configuration of a database updating apparatus for wireless LAN based positioning according to one or more embodiments of the present disclosure.

A database updating apparatus 130 for wireless LAN based positioning according to one or more embodiments of the present disclosure includes a grid cell determining unit 210, an unmeasured parameter checking unit 220, a radiowave environment estimating unit 230, a database updating unit 240, an estimated information database 250, a measured wireless LAN environment information receiving unit 260, and a measured wireless LAN environment information updating unit 270. Although the database updating apparatus 130 for wireless LAN based positioning according to one or more embodiments of the present disclosure is described as including only a grid cell determining unit 210, an unmeasured parameter checking unit 220, a radiowave environment estimating unit 230, a database updating unit 240, an estimated information database 250, a measured wireless LAN environment information receiving unit 260, and a measured wireless LAN environment information updating unit 270, the embodiment should be considered in descriptive sense only and not for the purposes of limitation and those skilled in the art will appreciate that various modifications, additions and substitutions may be made in the components of the database updating apparatus 130 without departing from the essential characteristics of the present disclosure.

The grid cell determining unit 210 determines an information-unmeasured grid cell among grid cells divided by pCell ID, wherein the information-unmeasured grid cell is a grid cell that has unmeasured information among parameters of the wireless LAN environment information matched to the grid cells. The unmeasured parameter checking unit 220 checks an unmeasured parameter in the information-unmeasured grid cell. The unmeasured parameter 220 may determine whether the unmeasured parameter is a received signal strength value and whether position information of an AP transmitting a wireless LAN signal is stored in the information-unmeasured grid cell. In addition, the unmeasured parameter 220 may determine whether the unmeasured parameter is a received signal strength value and a MAC address of an AP transmitting a wireless LAN signal.

The radiowave environment estimating unit 230 generates radiowave environment estimation information by estimating the unmeasured information based on the unmeasured parameter checked. The radiowave environment estimating unit 230 generates the radiowave environment estimation information by estimating the unmeasured parameter based on any one of a distance-dependent radiowave strength value application scheme and an adjacent grid cell-based interpolation scheme. Herein, the distance-dependent radiowave strength value application scheme may be a propagation prediction model including at least one of Okumura-hata and Cost231; however, the present disclosure is not limited thereto.

If the unmeasured parameter checking unit 220 determines that the unmeasured parameter checked is a received signal strength value and if position information of an AP transmitting a wireless LAN signal is stored in the information-unmeasured grid cell, the radiowave environment estimating unit 230 generates the radiowave environment estimation information including first estimated AP signal strength information obtained by estimating a signal strength of the AP by applying the distance-dependent radiowave strength value application scheme to the position information of the AP. The radiowave environment estimating unit 230 calculates an average signal strength value of APs located at the same distance from the information-unmeasured grid cell, and sets the average signal strength value calculated as a representative signal strength value of the APs located at the same distance from the information-unmeasured grid cell.

If the unmeasured parameter checking unit 220 determines that the unmeasured parameter checked is a received signal strength value and a MAC address of an AP transmitting a wireless LAN signal, the radiowave environment estimating unit 230 selects adjacent grid cells among peripheral grid cells of the information-unmeasured grid call and generates the radiowave environment estimation information including an estimated MAC address obtained by estimating a common MAC address shared in the adjacent grid cells selected as the MAC address of the AP. The radiowave environment estimating unit 230 generates the radiowave environment estimation information including a second estimated AP signal strength value obtained by estimating the received signal strength value as a signal strength mid-value of the AP corresponding to the common MAC address shared in the adjacent grid cells selected.

The radiowave environment estimating unit 230 generates the radiowave environment estimation information including a third estimated AP signal strength value obtained by estimating a signal strength of the AP by applying the distance-dependent radiowave strength value application scheme to the grid cell in which the estimated MAC address is stored. If the information-unmeasured grid cell is an outdoor region, the radiowave environment estimating unit 230 generates the radiowave environment estimation information including a fourth estimated AP signal strength value obtained by estimating a signal strength of an AP transmitting a wireless LAN signal, by applying a radiowave strength value application scheme based on prestored topographic information and building information. Herein, the radiowave strength value application scheme based on prestored topographic information and building information may be a cell planning tool; however, the present disclosure is not limited thereto.

The database updating unit 240 reflects the radiowave environment estimation information in the information-unmeasured grid cell determined. The database updating unit 240 stores the representative signal strength value separately. The measured wireless LAN environment information receiving unit 260 receives measured wireless LAN environment information on the information-unmeasured grid cell from a measuring device. The measured wireless LAN environment information updating unit 270 updates the database by applying a high weight to the measured wireless LAN environment information among the radiowave environment estimation information and the measured wireless LAN environment information.

Figure 3:
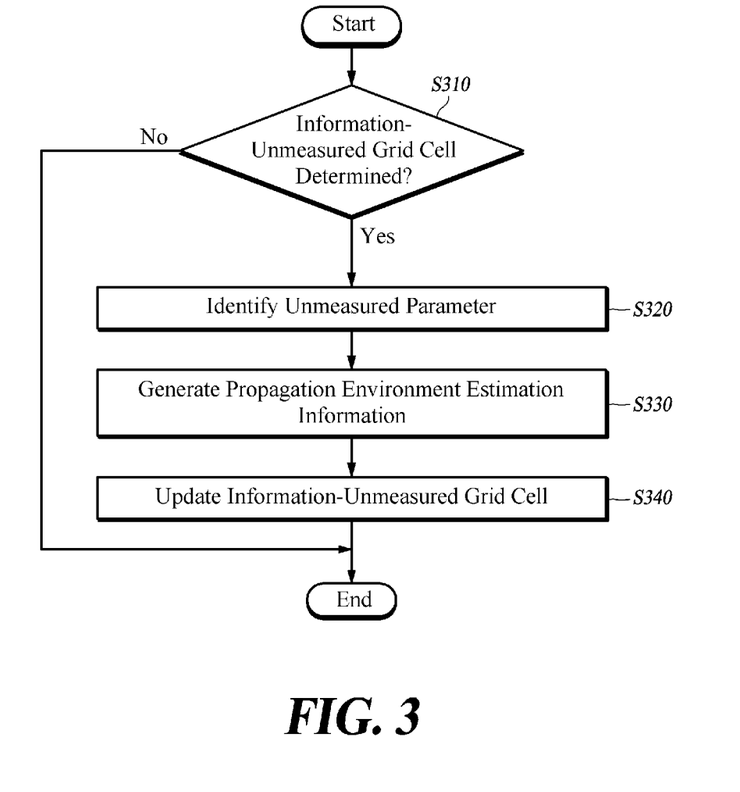
FIG. 3 is a flow chart illustrating a method for updating a database for wireless LAN based positioning according to one or more embodiments of the present disclosure.

FIG. 3 is a flow chart illustrating a method for updating a database for wireless LAN based positioning according to one or more embodiments of the present disclosure.

The database updating apparatus 130 determines whether there is an information-unmeasured grid cell among grid cells divided by pCell ID stored in the database 140, wherein the information-unmeasured grid cell is a grid cell that has unmeasured information among parameters of wireless LAN environment information matched to the grid cells (step S310). Specifically, the database updating apparatus 130 may search grid cells stored in the database 140 and classify the same into an information-unmeasured grid cell group and an information-measured grid cell group.

If step S310 determines that there is the information-unmeasured grid cell among the grid cells, the database updating apparatus 130 checks an unmeasured parameter that is unmeasured information in the information-unmeasured grid cell (step S320). Herein, the wireless LAN environment information includes one or more of a MAC address of an AP relaying a wireless LAN signal, received signal strength for each MAC address, AP channel information, and AP frequency information. Thus, the database updating apparatus 130 checks the unmeasured parameter to determine which of the wireless LAN environment information is unmeasured.

The database updating apparatus 130 generates radiowave environment estimation information by estimating the unmeasured information based on the unmeasured parameter checked (step S330). The data base updating apparatus 130 generates the radiowave environment estimation information by estimating the unmeasured parameter based on any one of a distance-dependent radiowave strength value application scheme and an adjacent grid cell-based interpolation scheme. Herein, the distance-dependent radiowave strength value application scheme may be a propagation prediction model including at least one of Okumura-hata and Cost231; however, the present disclosure is not limited thereto. The database updating apparatus 130 reflects the radiowave environment estimation information in the information-unmeasured grid cell determined (step S340). Specifically, the database updating apparatus 130 updates the database 140 storing the information-unmeasured grid cell.

Although FIG. 3 illustrates that steps S310 to S340 are performed sequentially, this should be considered in descriptive sense only and not for the purposes of limitation and those skilled in the art will appreciate that modifications may be made therein without departing from the essential characteristics of the present disclosure. For example, the order of steps in FIG. 3 may be changed, or one or more of steps S310 to 340 may be performed in parallel.

The database updating method for wireless LAN-based positioning according to the embodiment of the present disclosure illustrated in FIG. 3 may be implemented in a program and may be written on a computer-readable recording medium. The computer-readable recording medium recording a program for implementing the database updating method for wireless LAN-based positioning according to the embodiment of the present disclosure may be any data storage device that can store data which can be thereafter read by a computer system. Examples of the computer-readable recording medium may include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code may be stored and executed in a distributed fashion. In addition, functional programs, codes, and code segments for accomplishing the present invention can be easily construed by programmers skilled in the art to which the embodiment of the present disclosure pertains.

Figure 4:
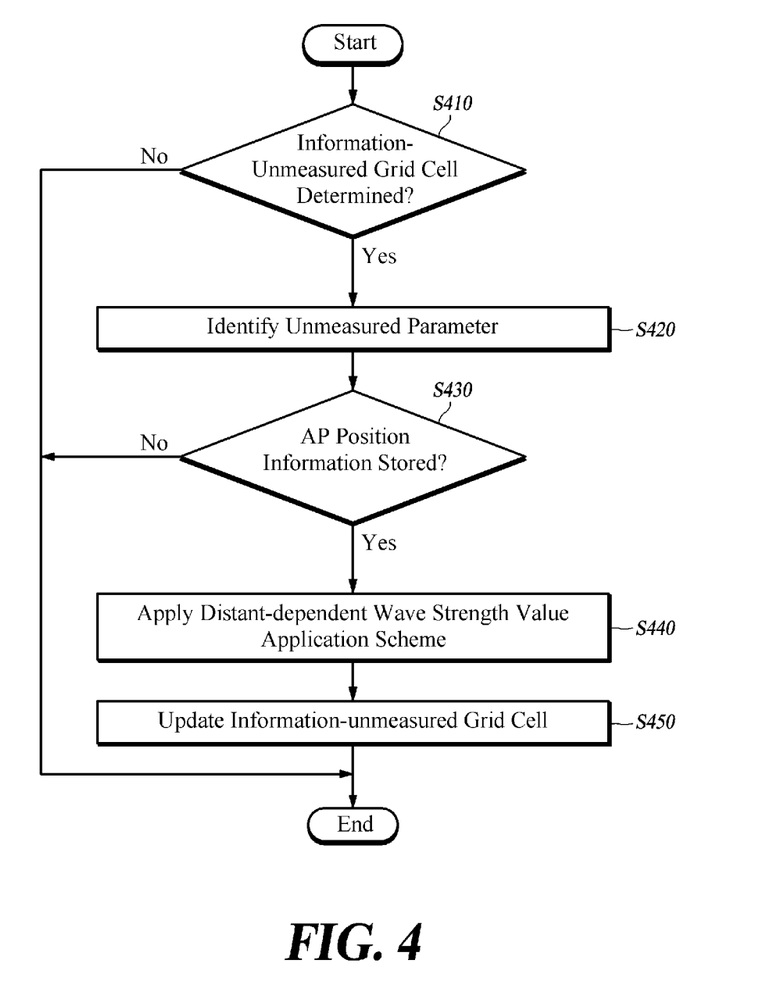
FIG. 4 is a flow chart illustrating a method for updating a database by using a distance-dependent radiowave strength value application scheme according to one or more embodiments of the present disclosure.

FIG. 4 is a flow chart illustrating a method for updating a database by using a distance-dependent radiowave strength value application scheme according to one or more embodiments of the present disclosure.

The database updating apparatus 130 determines whether there is an information-unmeasured grid cell among grid cells divided by pCell ID stored in the database 140, wherein the information-unmeasured grid cell is a grid cell that has unmeasured information among parameters of wireless LAN environment information matched to the grid cells (step S410). Specifically, the database updating apparatus 130 may search grid cells stored in the database 140 and classify the same into an information-unmeasured grid cell group and an information-measured grid cell group.

If step S410 determines that there is the information-unmeasured grid cell among the grid cells, the database updating apparatus 130 checks an unmeasured parameter that is unmeasured information in the information-unmeasured grid cell (step 4320). Herein, the wireless LAN environment information includes one or more of a MAC address of an AP relaying a wireless LAN signal, a received signal strength for each MAC address, AP channel information, and AP frequency information. Thus, the database updating apparatus 130 checks the unmeasured parameter to determine which of the wireless LAN environment information is unmeasured.

If the unmeasured parameter checked is a received signal strength value, the database updating apparatus 130 determines whether position information of an AP transmitting a wireless LAN signal is stored in the information-unmeasured grid cell (step S430). If step S430 determines that position information of an AP transmitting a wireless LAN signal is stored in the information-unmeasured grid cell, the data base updating apparatus 130 generates radiowave environment estimation information including first estimated AP signal strength information obtained by estimating a signal strength of the AP by applying a distance-dependent radiowave strength value application scheme to the position information of the AP (step S440). Herein, the distance-dependent radiowave strength value application scheme may be a propagation prediction model including at least one of Okumura-hata and Cost231; however, the present disclosure is not limited thereto. In addition, the data base updating apparatus 130 calculates an average signal strength value of APs located at the same distance from the information-unmeasured grid cell, and sets the average signal strength value calculated as a representative signal strength value of the APs located at the same distance from the information-unmeasured grid cell. The database updating apparatus 130 may store the representative signal strength value separately.

The database updating apparatus 130 reflects the radiowave environment estimation information in the information-unmeasured grid cell determined (step S450). Specifically, the database updating apparatus 130 updates the database 140 storing the information-unmeasured grid cell.

Although FIG. 4 illustrates that steps S410 to S450 are performed sequentially, this should be considered in descriptive sense only and not for the purposes of limitation and those skilled in the art will appreciate that modifications may be made therein without departing from the essential characteristics of the present disclosure. For example, the order of steps in FIG. 4 may be changed, or one or more of steps S410 to 450 may be performed in parallel.

The database updating method using a distance-dependent radiowave strength value application scheme according to the embodiment of the present disclosure illustrated in FIG. 4 may be implemented in a program and may be written on a computer-readable recording medium. The computer-readable recording medium recording a program for implementing the database updating method using a distance-dependent radiowave strength value application scheme according to the embodiment of the present disclosure may be any data storage device that can store data which can be thereafter read by a computer system. Examples of the computer-readable recording medium may include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code may be stored and executed in a distributed fashion. In addition, functional programs, codes, and code segments for accomplishing the present invention can be easily construed by programmers skilled in the art to which the embodiment of the present disclosure pertains.

Figure 5:
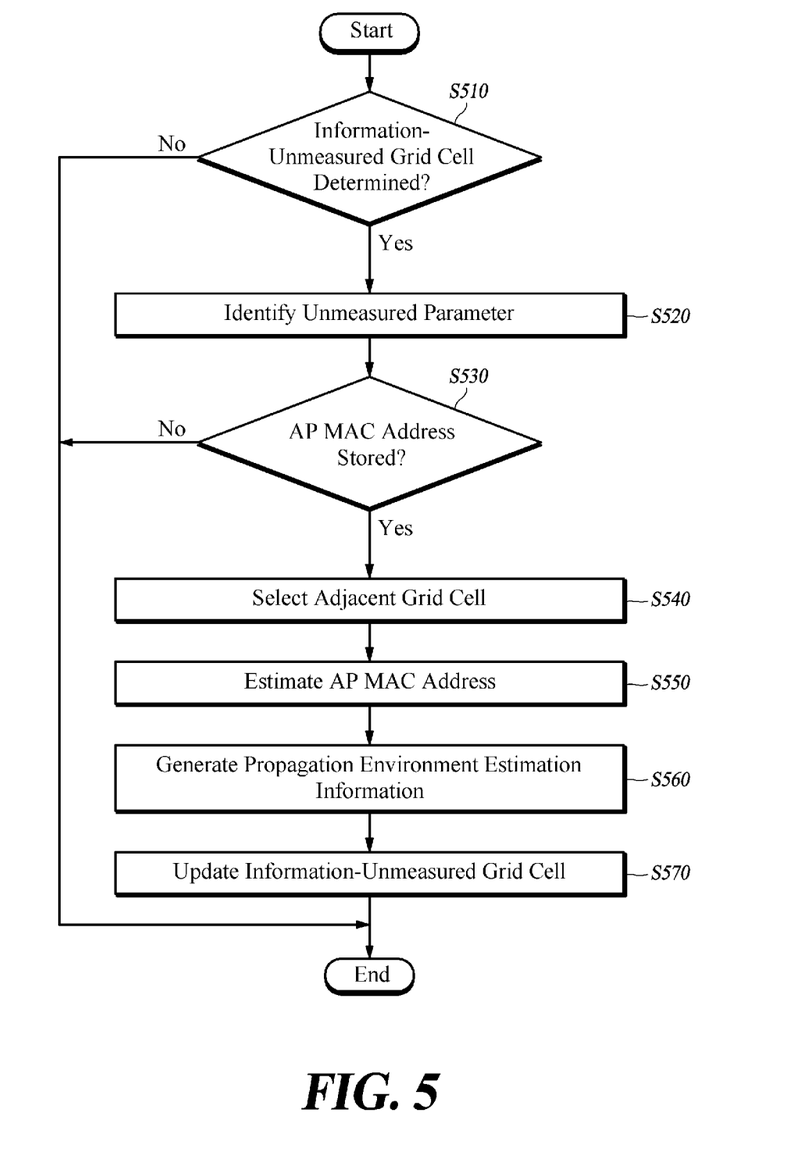
FIG. 5 is a flow chart illustrating a method for updating a database by using an adjacent cell-based interpolation scheme according to one or more embodiments of the present disclosure.

FIG. 5 is a flow chart illustrating a method for updating a database by using an adjacent cell-based interpolation scheme according to one or more embodiments of the present disclosure.

The database updating apparatus 130 determines whether there is an information-unmeasured grid cell among grid cells divided by pCell ID stored in the database 140, wherein the information-unmeasured grid cell is a grid cell that has unmeasured information among parameters of wireless LAN environment information matched to the grid cells (step S510). Specifically, the database updating apparatus 130 may search grid cells stored in the database 140 and classify the same into an information-unmeasured grid cell group and an information-measured grid cell group.

If S510 determines that there is the information-unmeasured grid cell among the grid cells, the database updating apparatus 130 checks an unmeasured parameter that is unmeasured information in the information-unmeasured grid cell (step S520). Herein, the wireless LAN environment information includes one or more of a MAC address of an AP relaying a wireless LAN signal, a received signal strength for each MAC address, AP channel information, and AP frequency information. Thus, the database updating apparatus 130 checks the unmeasured parameter to determine which of the wireless LAN environment information is unmeasured.

If the unmeasured parameter checked is a received signal strength value, the database updating apparatus 130 determines whether position information of an AP transmitting a wireless LAN signal is stored in the information-unmeasured grid cell (step S530). If step S530 determines that position information of an AP transmitting a wireless LAN signal is not stored in the information-unmeasured grid cell, the data base updating apparatus 130 selects adjacent grid cells among peripheral grid cells of the information-unmeasured grid call (step S540). The database updating apparatus 130 generates the radiowave environment estimation information including an estimated MAC address obtained by estimating a common MAC address shared in the adjacent grid cells selected as the MAC address of the AP (step S550).

The database updating apparatus 130 generates the radiowave environment estimation information including a second estimated AP signal strength value obtained by estimating the received signal strength value as a signal strength mid-value of the AP corresponding to the common MAC address shared in the adjacent grid cells selected (step 560). The database updating apparatus 130 may generate the radiowave environment estimation information including a third estimated AP signal strength value obtained by estimating a signal strength of the AP by applying the distance-dependent radiowave strength value application scheme to the grid cell in which the estimated MAC address is stored. If the information-unmeasured grid cell is an outdoor region, the database updating apparatus 130 may generate the radiowave environment estimation information including a fourth estimated AP signal strength value obtained by estimating a signal strength of an AP transmitting a wireless LAN signal, by applying a radiowave strength value application scheme based on prestored topographic information and building information. Herein, the radiowave strength value application scheme based on prestored topographic information and building information may be a cell planning tool; however, the present disclosure is not limited thereto. The database updating apparatus 130 may receive measured wireless LAN environment information on the information-unmeasured grid cell from a measuring device, and update the database 140 by applying a high weight to the measured wireless LAN environment information among the radiowave environment estimation information and the measured wireless LAN environment information.

The database updating apparatus 130 reflects the radiowave environment estimation information in the information-unmeasured grid cell determined (step S570). Specifically, the database updating apparatus 130 updates the database 140 storing the information-unmeasured grid cell.

Although FIG. 5 illustrates that steps S510 to S550 are performed sequentially, this should be considered in descriptive sense only and not for the purposes of limitation and those skilled in the art will appreciate that modifications may be made therein without departing from the essential characteristics of the present disclosure. For example, the order of steps in FIG. 5 may be changed, or one or more of steps S510 to 550 may be performed in parallel.

The database updating method using an adjacent cell-based interpolation scheme according to the embodiment of the present disclosure illustrated in FIG. 5 may be implemented in a program and may be written on a computer-readable recording medium. The computer-readable recording medium recording a program for implementing the database updating method using an adjacent cell-based interpolation scheme according to the embodiment of the present disclosure may be any data storage device that can store data which can be thereafter read by a computer system. Examples of the computer-readable recording medium may include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code may be stored and executed in a distributed fashion. In addition, functional programs, codes, and code segments for accomplishing the present invention can be easily construed by programmers skilled in the art to which the embodiment of the present disclosure pertains.

Figure 6:
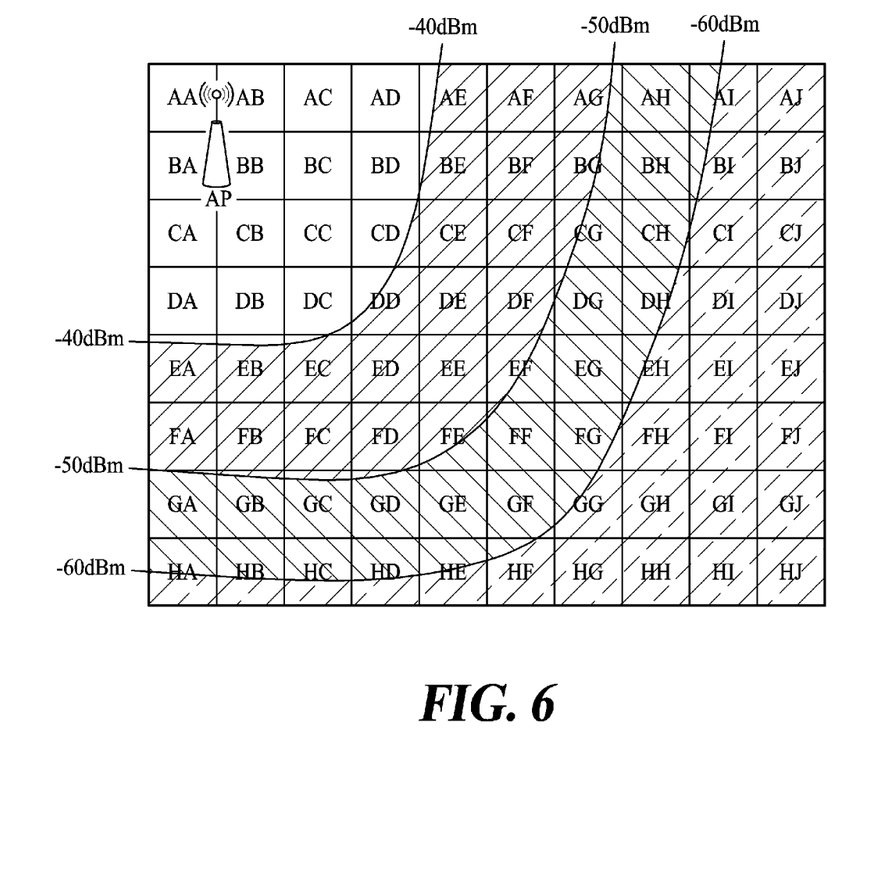
FIG. 6 is a diagram illustrating an example of a method for updating a database by using a distance-dependent radiowave strength value application scheme according to one or more embodiments of the present disclosure.

FIG. 6 is a diagram illustrating an example of a method for updating a database by using a distance-dependent radiowave strength value application scheme according to one or more embodiments of the present disclosure.

The database updating apparatus 130 determines an information-unmeasured grid cell among grid cells divided by pCell ID stored in the database 140, wherein the information-unmeasured grid cell is a grid cell that has unmeasured information among parameters of wireless LAN environment information matched to the grid cells. The database updating apparatus 130 checks an unmeasured parameter corresponding to the unmeasured information in the information-unmeasured grid cell determined, and generates radiowave environment estimation information by estimating the unmeasured information based on the unmeasured parameter checked. The database updating apparatus 130 reflects the radiowave environment estimation information in the information-unmeasured grid cell determined. The data base updating apparatus 130 generates the radiowave environment estimation information by estimating the unmeasured parameter based on any one of a distance-dependent radiowave strength value application scheme and an adjacent grid cell-based interpolation scheme. Herein, the distance-dependent radiowave strength value application scheme may be a propagation prediction model including at least one of Okumura-hata and Cost231, as illustrated in FIG. 6.

When determining that the unmeasured parameter checked is a received signal strength value and that a MAC address of an AP transmitting a wireless LAN signal is stored in the information-unmeasured grid cell, the data base updating apparatus 130 generates the radiowave environment estimation information including first estimated AP signal strength information obtained by estimating a signal strength of the AP by applying the distance-dependent radiowave strength value application scheme to the grid cell in which the MAC address of the AP is stored. For example, if the information-unmeasured grid cell is 'a cell EE' in FIG. 6, the database updating apparatus 130 knows a grid cell storing a MAC address of an AP transmitting a wireless LAN signal to the cell EE. Therefore, the database updating apparatus 130 may apply a propagation prediction model to estimate a received signal strength value of the cell EE to be −40 dBM, as illustrated in FIG. 6.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is applicable in various fields of determining an unmeasured cell and estimating radiowave environment information of the unmeasured cell to update a database, and is useful for reducing the time taken to directly measure radiowave environment characteristics.

CROSS-REFERENCE TO RELATED APPLICATION

If applicable, this application claims priority under 35 U.S.C. §119(a) of Patent Application No. 10-2010-0064247, filed on Jul. 5, 2010 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. An apparatus for updating a database for wireless local area network (WLAN) based positioning, the apparatus comprising:
    a database configured to store
        grid cells divided by pilot cell identifier (pCell ID) and base station-derived environment information, and
        WLAN environment information matched to the grid cells;
    a grid cell determining unit configured to determine an information-unmeasured grid cell among the grid cells stored in the database, wherein the information-unmeasured grid cell is a grid cell that has unmeasured information among parameters of the WLAN environment information matched to the grid cells;
    an unmeasured parameter checking unit configured to check an unmeasured parameter in the information-unmeasured grid cell;
    a radiowave environment estimating unit configured to generate radiowave environment estimation information by estimating the unmeasured parameter based on any one of a distance-dependent radiowave strength value application scheme and an adjacent grid cell-based interpolation scheme; and
    a database updating unit configured to update the information-unmeasured grid cell with the radiowave environment estimation information,
    wherein the radiowave environment estimating unit is configured to select adjacent grid cells among peripheral grid cells of the information-unmeasured grid cell and generate the radiowave environment estimation information including
        an estimated medium access control (MAC) address which is a common MAC address shared in the adjacent grid cells of an access point (AP), when the unmeasured parameter checking unit determined a MAC address of the AP transmitting a WLAN signal and that the unmeasured parameter is a received signal strength value, and
        a first estimated AP signal strength value obtained by estimating the received signal strength value of the AP corresponding to the common MAC address based on the adjacent grid cell-based interpolation scheme.

2. The apparatus of claim 1, wherein the radiowave environment estimating unit is configured to generate the radiowave environment estimation information including a second estimated AP signal strength value obtained by estimating a signal strength of an AP by applying the distance-dependent radiowave strength value application scheme to a position information of the AP, when the unmeasured parameter checking unit determined that the unmeasured parameter is a received signal strength value and that the position information of the AP transmitting a WLAN signal is stored in the information-unmeasured grid cell.

3. The apparatus of claim 2, wherein the radiowave environment estimating unit is configured to
    calculate an average signal strength value of APs located at the same distance from the information-unmeasured grid cell, and
    set the average signal strength value as a representative signal strength value of the APs.

4. The apparatus of claim 3, further comprising:
    an estimated information database configured to store the representative signal strength value separately from the database.

5. The apparatus of claim 1, wherein the radiowave environment estimating unit is configured to generate the radiowave environment estimation information including a third estimated AP signal strength value obtained by estimating a signal strength of the AP by applying the distance-dependent radiowave strength value application scheme to the grid cell in which the estimated MAC address is stored.

6. The apparatus of claim 1, wherein the radiowave environment estimating unit is configured to generate the radiowave environment estimation information including a fourth estimated AP signal strength value obtained by estimating a signal strength of an AP transmitting a WLAN signal, by applying a radiowave strength value application scheme based on prestored topographic information and building information, when the information-unmeasured grid cell is an outdoor region.

7. The apparatus of claim 6, wherein the radiowave strength value application scheme based on prestored topographic information and building information is a cell planning tool.

8. The apparatus of claim 1, further comprising:
    a measured WLAN environment information receiving unit configured to receive measured WLAN environment information on the information-unmeasured grid cell from a measuring device; and
    a measured WLAN environment information updating unit configured to update the database by applying a higher weight to the measured WLAN environment information than to the radiowave environment estimation information.

9. The apparatus of claim 1, wherein the distance-dependent radiowave strength value application scheme is a propagation prediction model including at least one of Okumura-hata and Cost231.

10. An apparatus for updating a database for wireless local area network (WLAN) based positioning, the apparatus comprising:

a database configured to store
- grid cells divided by pilot cell identifier (pCell ID) and base station-derived environment information, and WLAN environment information matched to the grid cells;

a grid cell determining unit configured to determine an information-unmeasured grid cell among the grid cells stored in the database, wherein the information-unmeasured grid cell is a grid cell that has unmeasured information among parameters of the WLAN environment information matched to the grid cells;

an unmeasured parameter checking unit configured to determine that the unmeasured information in the information-unmeasured grid cell is a received signal strength value and to determine a medium access control (MAC) address of an access point (AP) transmitting a WLAN signal;

a radiowave environment estimating unit configured to
- select adjacent grid cells among peripheral grid cells of the information-unmeasured grid cell,
- estimate a common MAC address shared in the adjacent grid cells as the MAC address of the AP, and
- generate radiowave environment estimation information including an estimated AP signal strength value obtained by estimating the received signal strength value of the AP corresponding to the common MAC address based on an adjacent grid cell-based interpolation scheme; and a database updating unit configured to update the information-unmeasured grid cell with the radiowave environment estimation information.

* * * * *